United States Patent [19]
Ohta

[11] Patent Number: 5,144,741
[45] Date of Patent: Sep. 8, 1992

[54] METHOD OF MANUFACTURING A MAGNETIC HEAD WITH TWO CANTED GAPS

[75] Inventor: Hiroyuki Ohta, Yamagata, Japan

[73] Assignee: Pioneer Electronic Corporation, Tokyo, Japan

[21] Appl. No.: 789,032

[22] Filed: Nov. 7, 1991

Related U.S. Application Data

[62] Division of Ser. No. 539,402, Jun. 18, 1990, Pat. No. 5,084,797.

[30] Foreign Application Priority Data

Aug. 11, 1989 [JP] Japan .................... 1-206832

[51] Int. Cl.⁵ .............................. G11B 5/42
[52] U.S. Cl. ............................ 29/603; 360/121; 360/124
[58] Field of Search ........ 29/603; 360/119-121, 360/125, 123, 124

[56] References Cited

U.S. PATENT DOCUMENTS 5,029,380  7/1991  Smukal ............................ 29/603

FOREIGN PATENT DOCUMENTS 58-088820  5/1983  Japan .
58-220237 12/1983  Japan .
61-090311  5/1986  Japan .

Primary Examiner—Carl E. Hall
Attorney, Agent, or Firm—Sughrue, Mion, Zinn, Macpeak & Seas

[57] ABSTRACT

A core block almost square in cross section has two winding grooves cut in its two polished sides forming one of its four corners. The grooved sides of the core block are vapor-deposited with a gap spacer to form magnetic gaps. Two side blocks, which have their one side cut with inclined track grooves, are bonded to the two sides of the core block, with the track groove sides in contact with the core block. At this time, the side blocks are adjusted to align the corresponding slant track grooves in the two side blocks. This ensures that the gap heights are equal in a single head chip, which in turn eliminates a time-consuming pairing process required with conventional manufacturing method. The assembled block is cut at their corners and then sliced along the slant track grooves to form a number of head chips. The slant top portion of the sliced chip is then cut perpendicularly with respect to the sides of the chip so that the two magnetic gaps on the head front are inclined in opposite directions at desired azimuth angles. The head thus manufactured employs sub-coils to eliminate the crosstalk between the two magnetic gaps.

3 Claims, 8 Drawing Sheets

METHOD OF MANUFACTURING A MAGNETIC HEAD WITH TWO CANTED GAPS

This is a divisional of application Ser. No. 07/539,402 filed Jun. 18, 1990, now U.S. Pat. No. 5,084,797.

BACKGROUND OF THE INVENTION

The present invention relates to a tape recorder in which recording and reproduction of sound is done by wrapping a magnetic tape slantwise around a rotating drum for a predetermined angle and feeding the tape under magnetic heads by rotating the drum in such a way that the recorded tracks run slantwise on the tape. And more specifically, the invention relates to a magnetic head of digital audio tape recorders that digitally records sounds, and also to a method of manfacturing the magnetic head.

PRIOR ART

The tape recorders of this kind usually employ a helical scan system, in which there are two magnetic heads A, B located at opposing positions across a rotating drum C, as shown in FIG. 22. As the drum C turns, the magnetic A first records on or reproduces from the tape and then the second magnetic head B performs the same operation on the tape. To prevent the magnetic heads A, B from picking up signals recorded on the adjacent tracks, these heads each have their magnetic gaps inclined in opposite directions. In other words they have opposing azimuth angles.

When the two magnetic heads A, B are mounted 180 degrees apart across the rotary drum C, they must be set precisely at the same height as the rotating center of the drum for proper tracking. To overcome difficulty in meeting this assembly requirement, these two magnetic heads A, B may be installed together on one side of the rotating drum C, as shown in FIG. 23, as with digital audio tape recorders that store in memory signals reproduced by the magnetic heads before reproducing sounds. In this case, the chips $A_1$, $B_1$ of the magnetic heads A, B are mounted on a dime D, as shown in FIG. 25. If the heights $H_{OA}$, $H_{OB}$ from the end surfaces of each chip $A_1$, $B_1$ to the magnetic gaps are not equal, as shown in FIG. 24, the tracking positions of the heads attached to the one dime D will differ from each other. The gap heights must have the accuracy error within a few microns and cannot be adjusted after assembly. Such a high precision cannot be obtained with the manufacturing process. The compromise therefore is to measure the gap height of the chips $A_1$, $B_1$ and pair those with the same heights. This process, however, is time-consuming and leaves a large number of unmatching chips useless.

SUMMARY OF THE INVENTION

To eliminate the above drawback of the conventional magnetic heads with two tilted gaps, the object of this invention is to provided a magnetic head with two canted gaps and the method of its manufacturing, in which two magnetic heads are manufactured as one piece so that the heights of the magnetic gaps from the end surface of the head are equal, making the pairing process unnecessary.

To achieve the above objective, the magnetic head according to this invention comprises: a core block disposed at the center of the magnetic head; two side blocks bonded to each side of the core block with magnetic gaps formed one on each side of the core block between it and the side blocks, said magnetic gaps inclined so as to obtain desired azimuth angles; openings formed in the joining surfaces of either the core block or side blocks; and coils passed through the openings and wound on each of the side blocks.

The magnetic head of this invention is manufactured by cutting winding grooves either in two sides of a core block forming one of its four corners or in joining surfaces of side blocks to be bonded to said two sides of the core block, said core blocks being almost square in cross section, said two joining surfaces between the core block and the side blocks forming two magnetic gaps; cutting track grooves either in the core block or in the side blocks in such a way that the cut track grooves will be inclined with respect to said one corner of the core block; assembling and bonding the side blocks onto said two sides of the core blocks; cutting the assembled block in such a manner that the distance between the two magnetic gaps will be a predetermined dimension; slicing the machined assembled block along the slant track grooves into a number of chips; and winding coils on the side blocks through the winding grooves.

Since the magnetic head of this invention is made in this way, the two magnetic gap heights can be set equal by aligning the positions of the block grooves with each other while checking them through a microscope during the process of joining the side block to the core block.

BRIEF DESCRIPTION OF THE DRAWINGS

FIG. 8 and FIG. 10 are side views;

DESCRIPTION OF THE PREFERRED EMBODIMENTS

One example of the magnetic head manufacturing method according to this invention will be described by referring to FIGS. 1 through 11.

Figure 1:
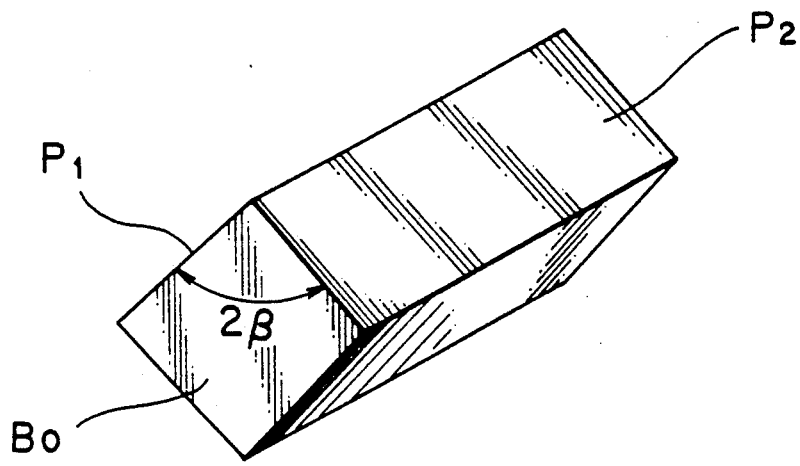
FIGS. 1 through 11 show the process of manufacturing the head chip of this invention, these figures being perspective views of the head chip except that FIG. 5 is a plan view

FIG. 1 shows a ferrite core block $B_O$, which is nearly square in cross section but the angle of its one corners $2\beta$ need not be 90 degrees. Two sides $P_1$, $P_2$ that together make this corner $2\beta$ are polished to form mirror surfaces.

Figure 2:
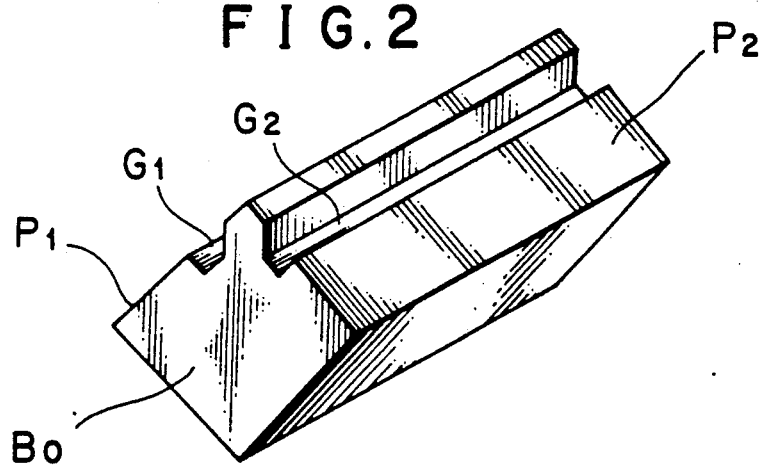

Then, the polished side $P_1$, $P_2$ of the core block $B_O$ are cut to form grooves $G_1$, $G_2$ winding, as shown in FIG. 2.

Figure 3:
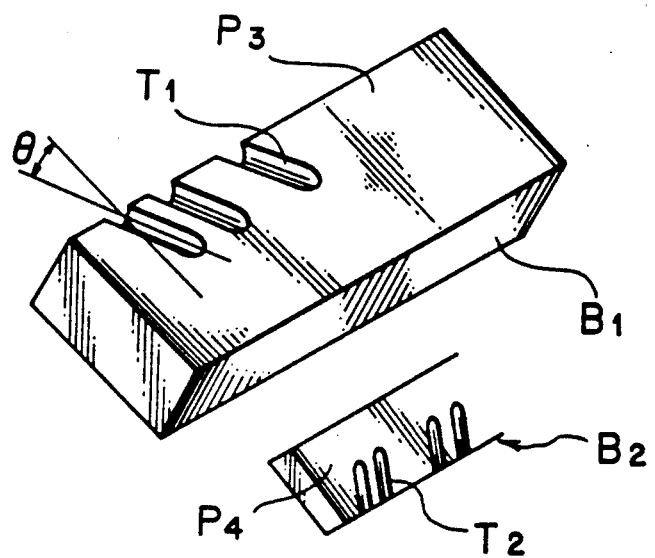

In adddition to the core block $B_O$, side blocks $B_1$, $B_2$ are prepared and one side of each block $P_3$, $P_4$ is polished. The polished sides $P_3$, $P_4$ is polished. The polished sides $P_3$, $P_4$ are then cut to one end at an angle $\theta$ to form track grooves $T_1$, $T_2$ as shown in FIG. 3.

Figure 4:
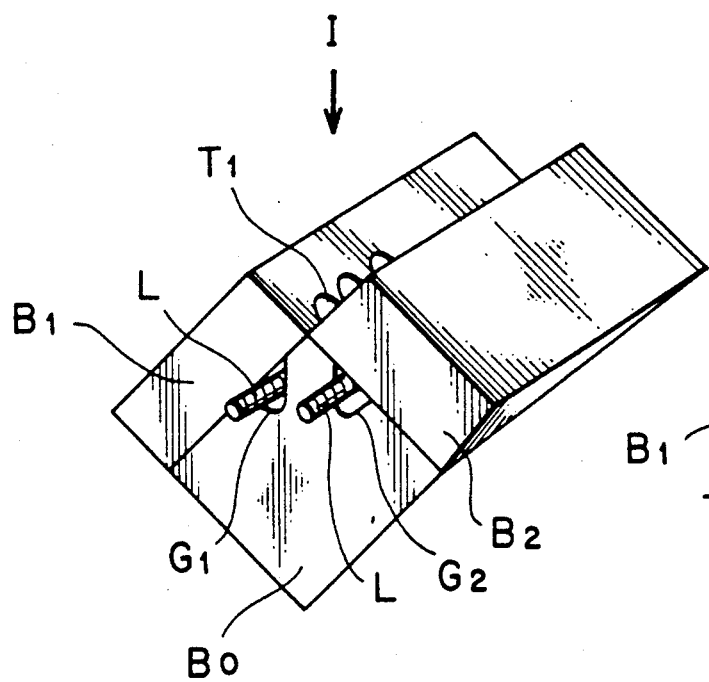
Figure 5:
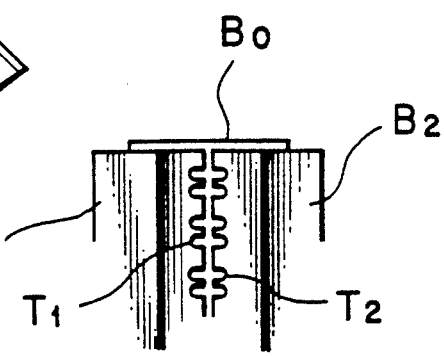

Next, a gap spacer is a vapor-deposited over an area of the surface of the core block $B_O$ ranging from the winding grooves $G_1$, $G_2$ in the sides $P_1$, $P_2$ up to the corners $2\beta$. And the side blocks $B_1$, $B_2$ are placed on the polished sides of the core block and then abutted against each other as shown in FIG. 4. The gap spacer forms a magnetic gap. The assembled block is then observed from above, i.e., from the direction of arrow I of FIG. 4 through a microscope and the side blocks $B_1$, $B_2$ are adjusted to align the positions of the track grooves $T_1$, $T_2$, as shown in FIG. 5.

Figure 6:
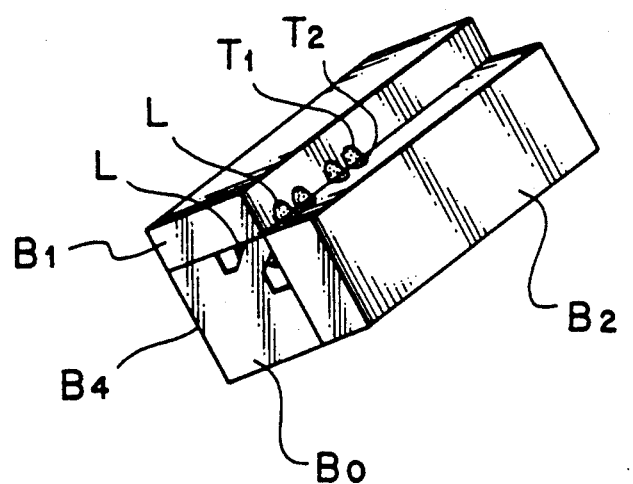
Figure 7:
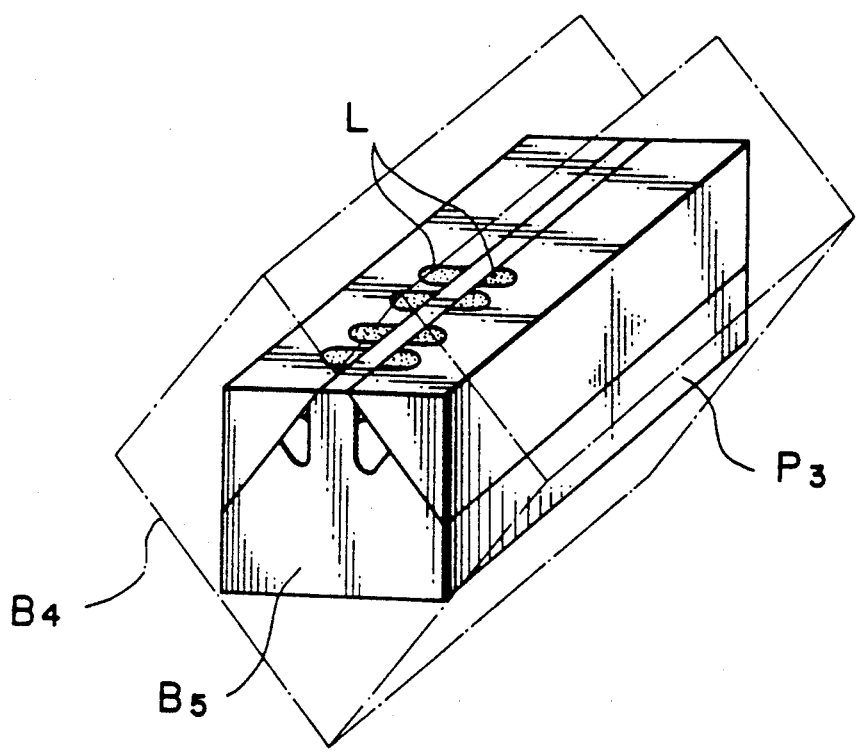
Figure 8:
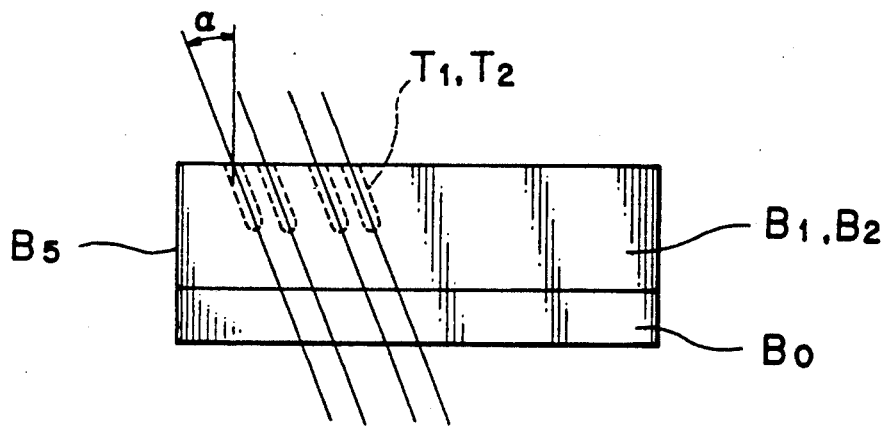

Then, as shown in FIG. 4, glass rods L are passed through the winding grooves $G_1$, $G_2$, and are heated and melted to fill the track grooves $T_1$, $T_2$ and a part of the winding grooves $G_1$, $G_2$, thus joining the core block $B_O$ with the side blocks $B_1$, $B_2$ to form a block assembly $B_4$, as shown in FIG. 6. The corners of the block assembly $B_4$ corresponding to the four corners of the core block $B_O$ are ground to form a block $B_5$, as shown in FIG. 7 (one-dot line indicates the block assembly $B_4$ before being ground).

Figure 9:
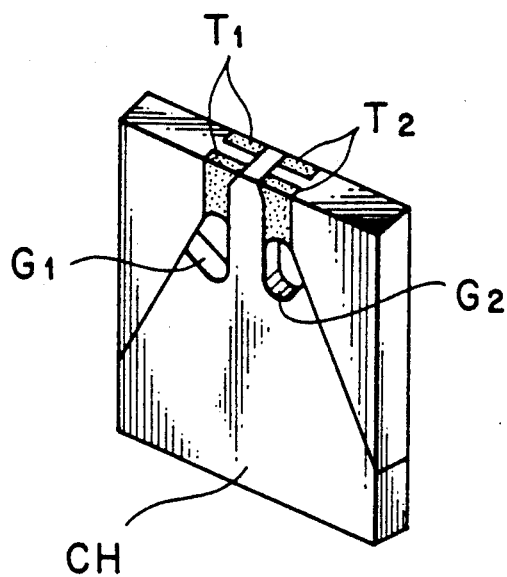
Figure 10:
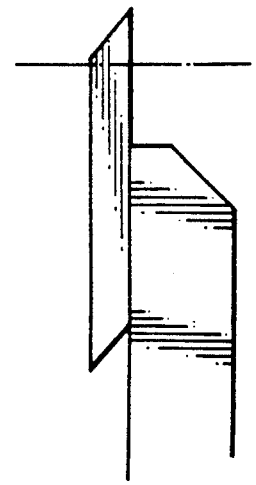
Figure 11:
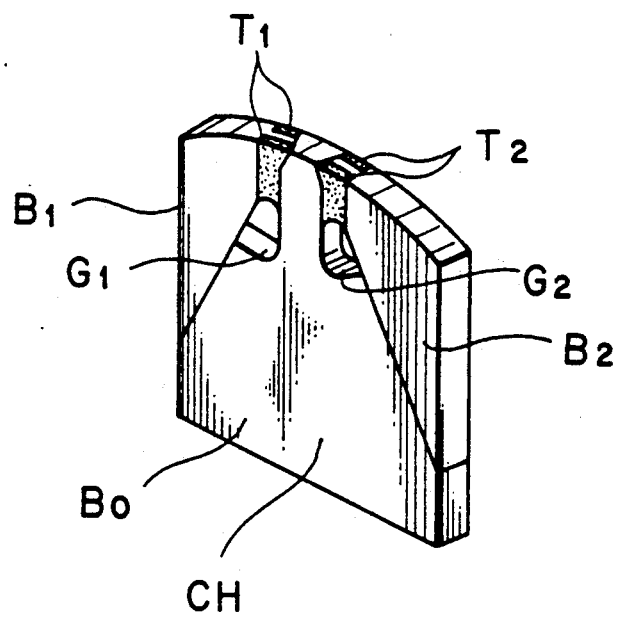

Next, the ground block $B_5$ is sliced along the track grooves $T_1$, $T_2$, which tilt at an angle of $\alpha$ with respect to the vetical line of the block (FIG. 8), to form chips CH as shown in FIG. 9. This chip CH is bonded to the dime D and the inclined top end of the chip CH where the two track grooves $T_1$, $T_2$ are seen is ground as shown in FIG. 11. Now, the chip CH is complete.

Figure 12:
FIG. 12 is a front view of the head chip.

FIG. 12 defines an azimuth angle $\gamma$ of the complete chip CH, the magnitude of which is specified in the related industrial standard (e.g., 20 degrees for the digital audio tape). The azimuth angle $\gamma$ has the following relationship with respect to the angle $\alpha$ and $\beta$ that are used during the manufacture of the chip.

$$\tan \gamma = \sin \alpha \tan \beta$$

In the case of digital audio tapes, when the angle $\beta$ is taken as 45 degrees for the core block $B_O$ square in cross section, the angle $\alpha$ can be determined as follows.

Since $$\tan \gamma = \tan 20° = 0.30397$$

$$\tan \beta = \tan 45° = 1$$

we get $$\sin \alpha = 0.30397$$

therefore $$\alpha = 21.344°$$

An angle $\theta$ used in machining the track grooves $T_1$, $T_2$ to achieve the above angle $\alpha$ is obtained from $$\tan \theta = \tan \alpha \cos \beta$$

The depth end of the chip CH is thus inclined by approximately the angle of $\alpha°$, which is in the range of several $\mu m$ (micro meters). And there will be no precision problem.

Figure 27:
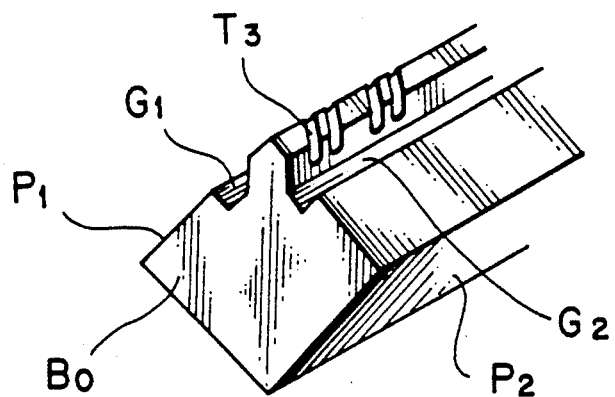
FIGS. 27 and 28 are perspective and side views of a core block showing another method of manufacturing.
Figure 28:
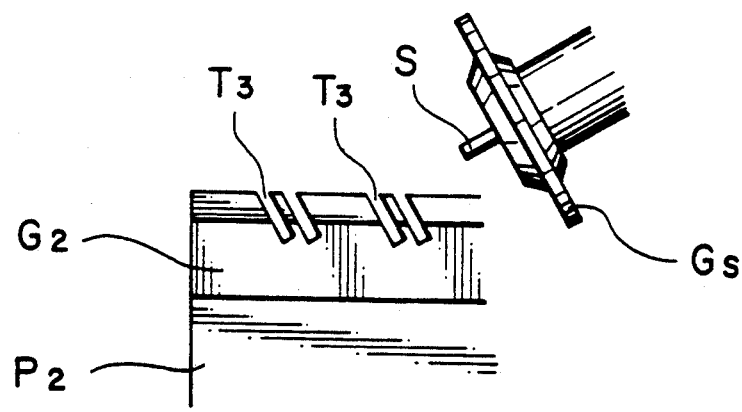
Figure 29:
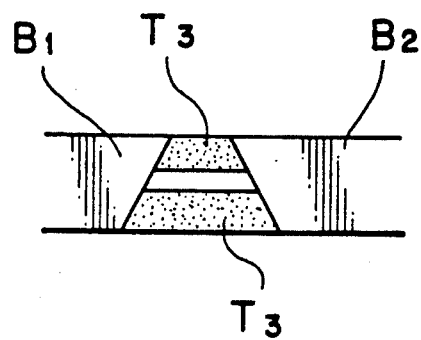
FIG. 29 is a plan view of the magnetic head near the gap formed according to the above manufacturing method.

While in the above embodiment, the winding grooves $G_1$, $G_2$ are cut in the sides $P_1$, $P_2$ of core block $B_0$, it is possible to form them in the sides $P_3$, $P_4$ of the side block $B_1$, $B_2$. The track grooves $T_1$, $T_2$ are formed in the sides $P_3$, $P_4$ of the side blocks $B_1$, $B_2$ in this embodiment. These track grooves may instead be formed inclined in the peak of the core block $B_0$ so that both sides $P_1$, $P_2$ communicates with each other, as indicated by $T_3$ of FIGS. 27 and 28. In this case, since the track grooves $T_1$, $T_2$ are not formed in the side blocks $B_1$, $B_2$, there is no need to align the track grooves $T_1$, $T_2$ with each other when the side blocks $B_1$, $B_2$ are joined to the core block $B_0$. However, it is necessary to tilt a spindle S of grinding stones GS when machining the track grooves, as shown in FIG. 28. This requires the use of a special track groove cutting equipment. The magnetic head with gaps thus formed is shown in FIG. 29.

Figure 13:
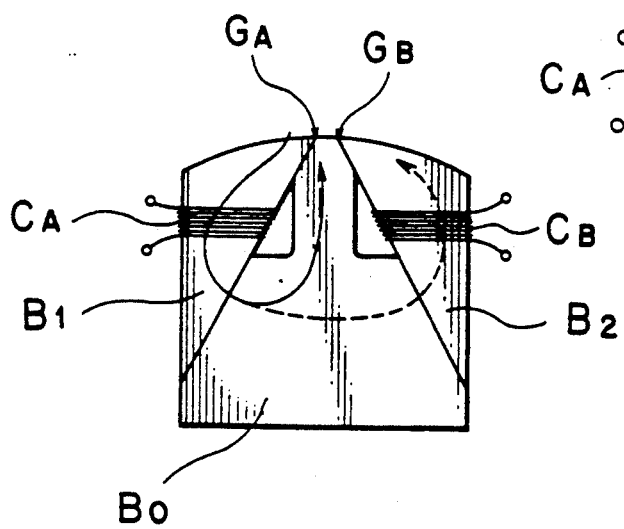
FIG. 13 is a diagram showing how crosstalk occurs.

Coils $C_A$, $C_B$ are passed through the winding grooves $G_1$, $G_2$ wound around the side block $B_1$, $B_2$ of the chip CH, as shown in FIG. 13.

When the tape produces a magnetic flux threading through a magnetic gap $G_A$ between the side block $B_1$ and the core block $B_0$, as illustrated by the solid line in FIG. 13, another magnetic flux as indicated by the broken line piercing through the other side block $B_2$ is induced because the latter side block $B_2$ is magnetically linked with the first two blocks. The induced flux causes a current to flow through the coil $C_B$. As a result, crosstalk occurs between the coil $C_A$ and the coil $C_B$.

A method of eliminating the crosstalk is described below.

Figure 14:
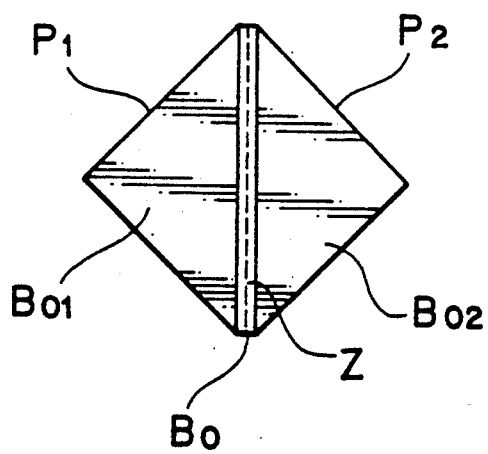
FIGS. 14, 15 and 18 show methods of solving the crosstalk problems.

FIG. 14 shows another core block $B_0$ whose sides $P_1$, $P_2$ are formed of two separate triangular blocks $B_{01}$, $B_{02}$, between which a non-magnetic material Z is sandwiched. The non-magnetic material Z magnetically isolates the two gaps $G_A$ and $G_B$ from each other, eliminating the problem of crosstalk.

Figure 15:
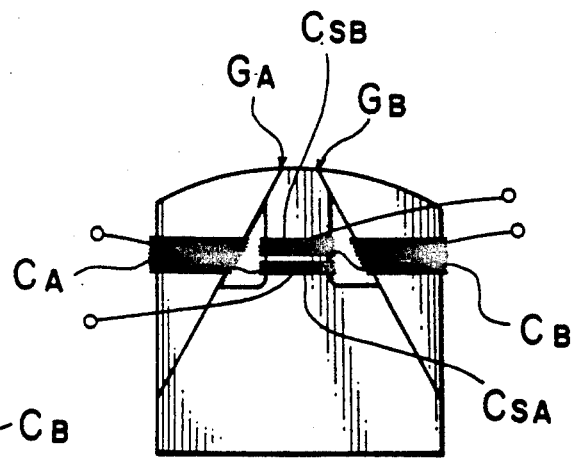

FIG. 15 shows still another example of the magnetic head, which has sub-coils $C_{SA}$, $C_{SB}$ in addition to the coils $C_A$, $C_B$, with the coil $C_A$ connected with the sub-coil $C_{SA}$ and the coil $C_B$ connected with the sub coil $C_{SB}$.

Now, let us consider the action during the recording operation, i.e., when an exciting current flows in the coil $C_A$.

Figure 16:
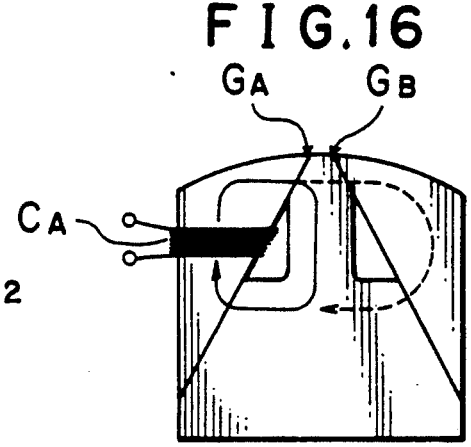
FIGS. 16, 17 and 19 to 21 are explanatory drawings showing the operation of these methods.

Suppose an exciting current flows in the coil $C_A$ to produce a flux piercing through the coil $C_A$ in the clockwise direction, as indicated by the solid line arrow in FIG. 16. The flux produces a magnetic field in the gap $G_A$, which is recorded on the tape. A major portion of the flux threads through the gap $G_A$ between the blocks as indicated by the solid line arrow, but the remaining portion of the flux leaks into other passage indicated by the dashed line arrow, thus producing a magnetic field also in the gap $G_B$.

Figure 17:
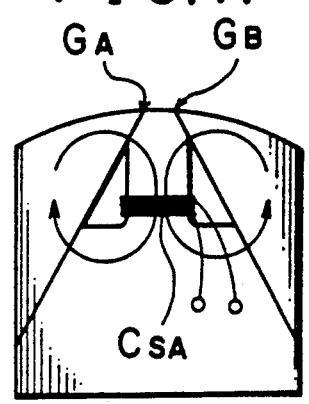

The sub-coil $C_{SA}$ is passed through the winding grooves $G_1$, $G_2$ to generate a flux circulating in the clockwise direction and a flux in the counterclockwise direction, as shown in FIG. 17. The counterclockwise flux induced by the sub-coil cancels the dashed line flux of FIG. 16, while the clockwise flux by the sub-coil reinforces the solid line flux. In this way, by connecting the coil $C_A$ and the sub-coil $C_{SA}$ in series with their polarities aligned and by selecting an appropriate winding ratio between these coils for the crosstalk characteristic of the chip CH, the magnetic field in the gap $G_B$ can be prevented from being generated.

Similarly, when an exciting current is applied to the coil $C_B$, the magnetic field in the gap $G_A$ can be prevented from being generated by the subd-coil $G_{SB}$.

Figure 18:
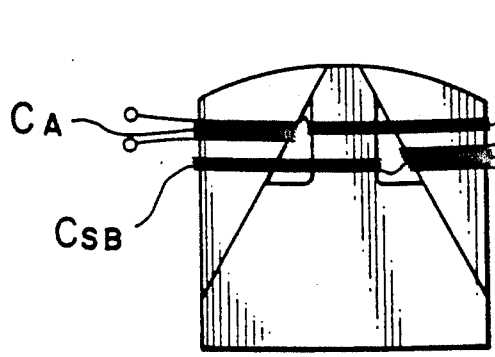

Conversely, during the playback operation, it is also possible to eliminate the crosstalk. With this method, the sub-coils $C_{SA}$, $C_{SB}$ must be passed through the winding grooves $G_1$, $G_2$ two times for each turn of winding. This troublesome work can be simplified by winding the sub-coils $C_{SA}$, $C_{SB}$ as shown in FIG. 18.

Figure 19:
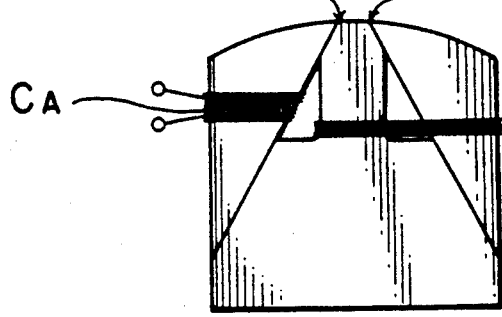
Figure 20:
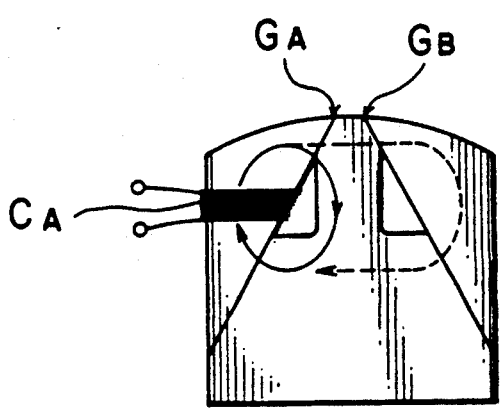
Figure 21:
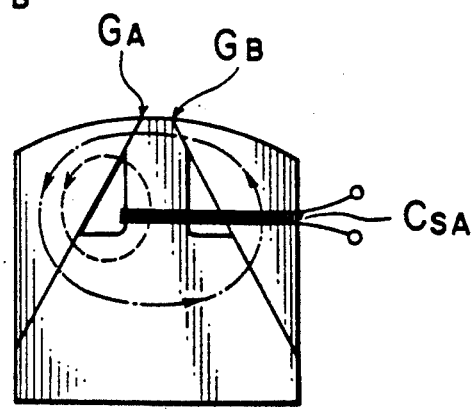
Figure 22:
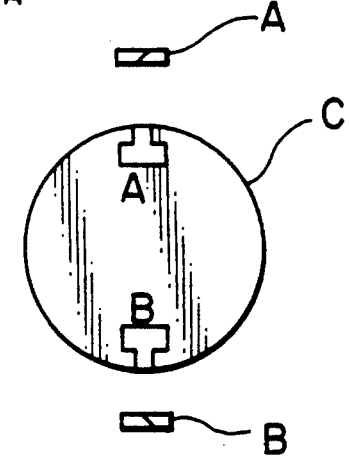
FIG. 22 is plan, elevational and rear elevational views of the drum of helical scan system.
Figure 23:
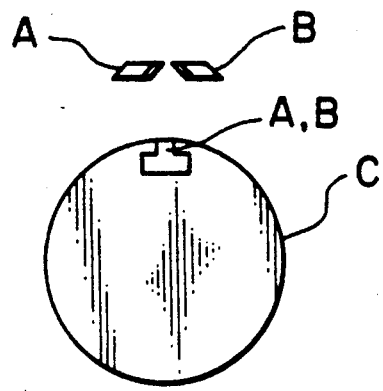
FIG. 23 is plan and elevational views of the drum with its heads replaced with a double head with slant gaps.
Figure 24:
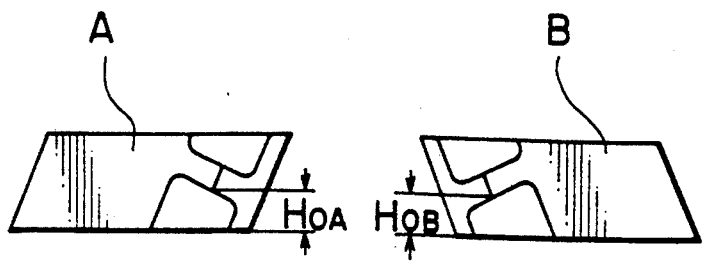
FIGS. 24 and 25 are a front and a plan view of the double head with slant gaps.
Figure 25:
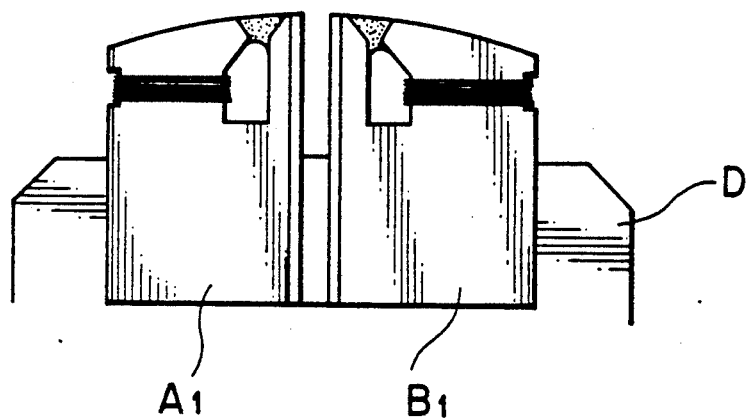
Figure 26:
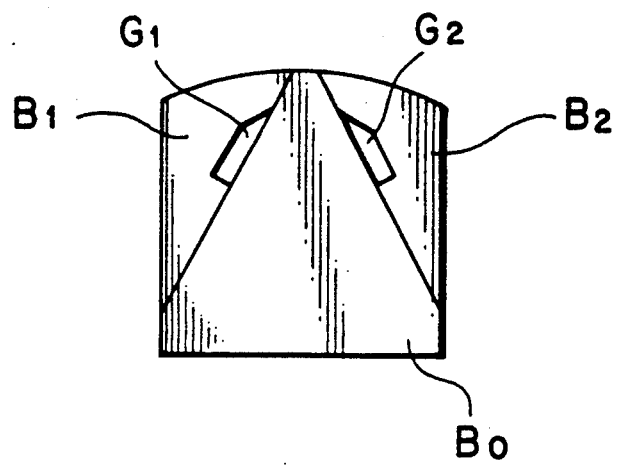
FIG. 26 is a front view of another embodiment.

The operation of the coils of FIG. 18 will be explained by referring to FIG. 19 that shows coils $C_A$ and $C_{SA}$. In FIG. 20, the coil $C_A$ produces a main flux represented by the solid line and a crosstalk flux indicated by the dashed line, both flowing clockwise. In FIG. 21 a current proportional in magnitude to the current flowing in the coil $C_A$ is applied to the sub-coil $C_{SA}$ to produce a main flux indicated by one-dot line and a crosstalk flux indicated by dashed line, both in the counterclockwise directions. The current applied to the sub-coil $C_{SA}$ is so set that the main flux of the sub-coil $C_{SA}$ cancels the crosstalk flux of the coil $C_A$. This eliminates the crosstalk flux that acts upon the magnetic gap $G_B$.

The crosstalk flux produced by the sub-coil $C_{SB}$ is weak compared with the main flux of the coil $C_A$, so that the magnetic gap $G_A$ will have a magnetic field strong enough to make recordings on the tape. In this way, the crosstalk problem can be solved.

The advantages of the invention may be summarized as follows. In the manufacturing process, the heights of the magnetic gaps from the end surface of the head chip can be made equal, obviating the need for pairing the two head chip halves with the same gap heights. This eliminates not only the time-consuming work of measuring the gap heights but also the wasting of many unused head chips not fit for pairing. Furthermore, the problem of crosstalk caused by two magnetic gaps being formed in a single head chip can be solved by this invention. Moreover, since a single block is sliced into a large number of chips, it is possible to provide inexpensive head chips in large numbers.

What is claimed is:

1. A method of manufacturing a magnetic head with two canted gaps, comprising the steps of:
   cutting winding grooves either in two sides of a core block forming one of its four corners or in joining surfaces of side blocks to be bonded to said two sides of the core block, said core block being almost square in cross section, said two joining surfaces between the core block and the side blocks forming two magnetic gaps;
   cutting track grooves either in the core block or in the side blocks such that the cut track grooves will be inclined with respect to said one corner of the core block;
   assembling and bonding the side blocks onto said two sides of the core block;
   cutting the assembled block such that the distance between the two magnetic gaps is equal to a predetermined value;
   slicing the machined assembled block along the slant track grooves into a number of chips; and
   winding coils on the side blocks through the winding grooves.

2. A method of manufacturing a magnetic head with two canted gaps as claimed in claim 1, wherein before the porcess of cutting winding grooves either in two sides of said core block forming one of its four corners or in joining surfaces of side blocks to be bonded to said two sides of the core block, said core block is formed into two separated blocks, between which a non-magnetic material is sandwiched to magnetically isolate said two canted gaps from each other.

3. A method of manufacturing a magnetic head with two canted gaps as claimed in claim 1, wherein after the process of winding coils on the side blocks through the winding grooves, sub-coils are provided to cancel crosstalk fluxes produced by said coils.

* * * * *